United States Patent
Cook et al.

(10) Patent No.: US 7,206,012 B2
(45) Date of Patent: Apr. 17, 2007

(54) MEMORY DEVICE ON OPTICAL SCANNER AND APPARATUS AND METHOD FOR STORING CHARACTERIZING INFORMATION ON THE MEMORY DEVICE

(75) Inventors: William P. Cook, Lexington, KY (US); Thomas A. Fields, Winchester, KY (US); Allen P. Johnson, Lexington, KY (US); Christopher D. Jones, Georgetown, KY (US); Gregory L. Ream, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 372 days.

(21) Appl. No.: 10/808,043

(22) Filed: Mar. 24, 2004

(65) Prior Publication Data

US 2005/0212902 A1 Sep. 29, 2005

(51) Int. Cl.
*B41J 2/47* (2006.01)
*B41J 2/435* (2006.01)

(52) U.S. Cl. ...................... 347/234; 347/245
(58) Field of Classification Search ................ 347/234, 347/249, 132, 133, 137, 242, 245; 399/12, 399/25, 66, 43; 382/167, 245
See application file for complete search history.

(56) References Cited

U.S. PATENT DOCUMENTS

| | | | | |
|---|---|---|---|---|
| 3,575,505 A | * | 4/1971 | Parmigiani | ................ 399/43 |
| 4,233,612 A | * | 11/1980 | Hirayama et al. | ......... 347/137 |
| 4,602,383 A | * | 7/1986 | Ogawa et al. | ............. 382/245 |
| 4,932,732 A | * | 6/1990 | Nakajima | ................ 359/210 |
| 4,975,626 A | * | 12/1990 | Yagi et al. | ................ 318/567 |
| 4,977,414 A | | 12/1990 | Shimada et al. | |
| 5,061,949 A | * | 10/1991 | Ogino et al. | ............. 347/133 |
| 5,272,503 A | * | 12/1993 | LeSueur et al. | ............. 399/25 |
| 5,291,223 A | | 3/1994 | Ogane et al. | |
| 5,491,540 A | * | 2/1996 | Hirst | ......................... 399/12 |
| 5,585,836 A | | 12/1996 | Pham et al. | |
| 5,684,523 A | | 11/1997 | Satoh et al. | |
| 5,699,091 A | | 12/1997 | Bullock et al. | |
| 5,712,666 A | | 1/1998 | Matsubara et al. | |
| 5,719,680 A | | 2/1998 | Yoshida et al. | |
| 5,734,406 A | | 3/1998 | Nakamura et al. | |
| 5,739,841 A | | 4/1998 | Ng et al. | |
| 5,749,019 A | | 5/1998 | Mestha | |
| 5,754,215 A | | 5/1998 | Kataoka et al. | |
| 5,754,576 A | * | 5/1998 | Kusano et al. | ......... 372/29.015 |
| 5,764,243 A | | 6/1998 | Baldwin | |
| 5,933,184 A | * | 8/1999 | Ishigami et al. | ............ 347/249 |
| 5,995,774 A | | 11/1999 | Applegate et al. | |

(Continued)

*Primary Examiner*—Hai Pham
*Assistant Examiner*—Carlos Martinez, Jr.
(74) *Attorney, Agent, or Firm*—Stevens & Showalter, LLP

(57) ABSTRACT

An optical scanner is provided having a memory device thereon. The memory device may store operational characteristics of the optical scanner or data that characterizes laser beam scan path and/or laser power requirements by each laser of the optical scanner. The memory device may be used to store historical information such as device temperature, cycles of operation and other historical information of components within a corresponding electrophotographic device. Still further, the electrophotographic device to which the optical scanner is installed may write operational data to the memory device, for example, to store a backup of registration and other operational parameters that are typically stored by the controller of the electrophotographic device.

19 Claims, 5 Drawing Sheets

U.S. PATENT DOCUMENTS

| | | |
|---|---|---|
| 6,014,161 A | 1/2000 | Hirst et al. |
| 6,039,430 A | 3/2000 | Helterline et al. |
| 6,043,835 A | 3/2000 | Au Yeung et al. |
| 6,094,280 A | 7/2000 | Hayasaki et al. |
| 6,122,460 A | 9/2000 | Meece et al. |
| 6,126,265 A | 10/2000 | Childers et al. |
| 6,144,393 A | 11/2000 | Kwat |
| 6,175,375 B1 * | 1/2001 | Able et al. .................. 347/132 |
| 6,268,878 B1 | 7/2001 | Yajima et al. |
| 6,335,747 B1 | 1/2002 | Munakta |
| 6,342,963 B1 * | 1/2002 | Yoshino ..................... 359/204 |
| 6,363,228 B1 * | 3/2002 | Ream ......................... 399/66 |
| 6,384,856 B2 | 5/2002 | Nakagawa et al. |
| 6,401,143 B1 | 6/2002 | Lupien, Jr. et al. |
| 6,408,013 B1 * | 6/2002 | Akagi et al. ........... 372/29.021 |
| 6,445,404 B1 | 9/2002 | Kerby et al. |
| 6,459,860 B1 | 10/2002 | Childers |
| 6,463,481 B1 | 10/2002 | Lupien, Jr. et al. |
| 6,486,906 B1 * | 11/2002 | Foster et al. ................ 347/234 |
| 6,498,616 B1 | 12/2002 | Nagumo et al. |
| 6,657,650 B1 * | 12/2003 | Omelchenko et al. ...... 347/234 |
| 6,697,401 B1 * | 2/2004 | Schrodinger ............. 372/38.02 |
| 6,747,766 B1 * | 6/2004 | Kamisuwa et al. ......... 358/505 |
| 7,079,685 B1 * | 7/2006 | Hirota et al. ............... 382/167 |
| 2001/0017645 A1 | 8/2001 | Toda |
| 2002/0088924 A1 | 7/2002 | Boardman et al. |
| 2002/0130792 A1 * | 9/2002 | Schaefer .................... 340/945 |
| 2002/0135789 A1 | 9/2002 | Ono |

* cited by examiner

MEMORY DEVICE ON OPTICAL SCANNER AND APPARATUS AND METHOD FOR STORING CHARACTERIZING INFORMATION ON THE MEMORY DEVICE

CROSS REFERENCE TO RELATED APPLICATIONS

The present application is related to U.S. patent application Ser. No. 10/808,130, filed on Mar. 24, 2004, entitled "System For Performing Laser Beam Linearity Correction And Algorithms And Methods For Generating Linearity Correction Tables From Data Stored In An Optical Scanner"; U.S. patent application Ser. No. 10/807,870, filed on Mar. 24, 2004, entitled "Algorithms And Methods For Determining Laser Beam Process Direction Position Errors From Data Stored On A Printhead"; and U.S. patent application Ser. No. 10/808,155, filed on Mar. 24, 2004. entitled "Electronic Systems And Methods For Reducing Laser Beam Process Direction Position Errors", each of which is filed currently herewith and hereby incorporated by reference herein.

BACKGROUND OF THE INVENTION

The present invention relates in general to an optical scanner such as a printhead, and in particular to an optical scanner including a memory device that stores operational characteristics of the optical scanner and/or of a corresponding electrophotographic device to which the optical scanner is installed. The present invention is also related to test fixtures for deriving such operational characteristics.

In electrophotography, a latent image is created on the surface of an electrostatically charged photoconductive drum by exposing select portions of the drum surface to laser light. Essentially, the density of the electrostatic charge on the surface of the drum is altered in areas exposed to a laser beam relative to those areas unexposed to the laser beam. The latent electrostatic image thus created is developed into a visible image by exposing the surface of the drum to toner, which contains pigment components and thermoplastic components. When so exposed, the toner is attracted to the drum surface in a manner that corresponds to the electrostatic density altered by the laser beam. Subsequently, a print medium, such as paper, is given an electrostatic charge opposite that of the toner and is pressed against the drum surface. As the medium passes the drum, the toner is pulled onto the surface of the medium in a pattern corresponding to the latent image written to the drum surface. The medium then passes through a fuser that applies heat and pressure to the toner on the medium. The heat causes constituents including the thermoplastic components of the toner to flow into the interstices between the fibers of the medium and the fuser pressure promotes settling of the toner constituents in these voids. As the toner is cooled, it solidifies and adheres the image to the medium.

In order to produce an accurate representation of an image to be printed, it is necessary for the printhead laser(s) to write to the drum in a scan direction, which is defined by a straight line that is perpendicular to the direction of movement of print media relative to the drum (the process direction). However, a scanning laser beam may follow a scan path that is not perpendicular to the process direction. Should the scan path of a laser beam deviate from the ideal scan direction, print artifacts may result. Laser beam scan path deviation is further complicated in color devices because excessive color to color mis-registration may cause color variation among other print artifacts.

Moreover, each laser should be capable of writing a line of evenly spaced print elements (Pels) on the surface of the drum. However, manufacturing tolerances, imperfections of optical devices in the optical system, and the inherent configuration of the printhead may cause variations in the spacing between written Pels along a scan line, which is referred to herein as scan line nonlinearity. Particularly, the velocity of the laser beam may vary across the scan line, which typically causes consecutive Pels to be written farther apart near the end portions of the scan line, and closer together near the middle portion of the scan line.

Still further, during a printing operation, the amount of toner attracted to the drum surface is highly sensitive to the amount of optical energy applied to the drum. Thus, the overall print quality is sensitive to the energy output by the printhead lasers(s). The amount of optical energy required on the surface of the drum to achieve a predetermined overall print quality may be determined by a number of factors including the print quality settings and print resolution of the electrophotographic device. Also, fundamental characteristics of the laser(s) in the printhead, such as laser turn on current and laser beam efficiency, must be known. Determining such fundamental laser characteristics typically requires meticulous factory calibration and relatively tight tolerances in the optical components of the printhead, resulting in an increased time and cost to manufacture the corresponding electrophotographic device.

SUMMARY OF THE INVENTION

The present invention overcomes the disadvantages of the prior art by providing an optical scanner such as a printhead that includes a memory device. The memory device may store operational characteristics of the optical scanner, such as data that characterizes a laser beam scan path of each laser of the optical scanner. The memory device may also store data that characterizes laser power requirements by each laser of the optical scanner. For example, the memory device may store data that characterizes laser power efficiency, laser turn on, or provide data that characterizes spot power or laser beam intensity. Still further, a corresponding electrophotographic device to which the optical scanner is installed may write operational data to the memory device on the optical scanner. For example, the memory device may be used to store temperature readings within the electrophotographic device, cycles of operations of the optical scanner or other components within the electrophotographic device and other historical information. Additionally, the memory device may be used as a memory device mirror, such as to store a backup of registration and other operational parameters that are typically stored by the corresponding electrophotographic device.

According to one embodiment of the present invention, an optical scanner includes a memory device for storing operational data. The stored data enables a host electrophotographic device to compensate for variances in laser beam scan path, laser beam linearity, laser beam intensity, and other operational characteristics, and also as provides enhanced processing capability. The present invention thus enables an image forming system for which the replacement of the optical scanner is facilitated in the field without the need for special image analysis tools normally found in a production environment.

According to another embodiment of the present invention, the optical scanner contains a non-volatile memory device accessible to processing logic, such as a controller of a corresponding electrophotographic device, through an interface that allows the electrophotographic device controller to both read from and write to the optical scanner memory. Thus, the electrophotographic device can use the memory device on the optical scanner to store historical information such as runtime conditions or events. Moreover, certain electronic calibration operations require a controller in a corresponding electrophotographic device to read out initial data from a memory location accessible to the controller, and to modify or further refine the initial data. The refined data may be stored in the memory on the optical scanner so that the data in the memory on the optical scanner is redundant to data stored by the controller of the electrophotographic device. The storage of redundant data is useful for backup purposes. For example, should another component of the electrophotographic device require replacement (such as the main system controller), the new controller can simply retrieve previously derived correction data from the memory on the optical scanner.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The Optical Scanner

Figure 1:
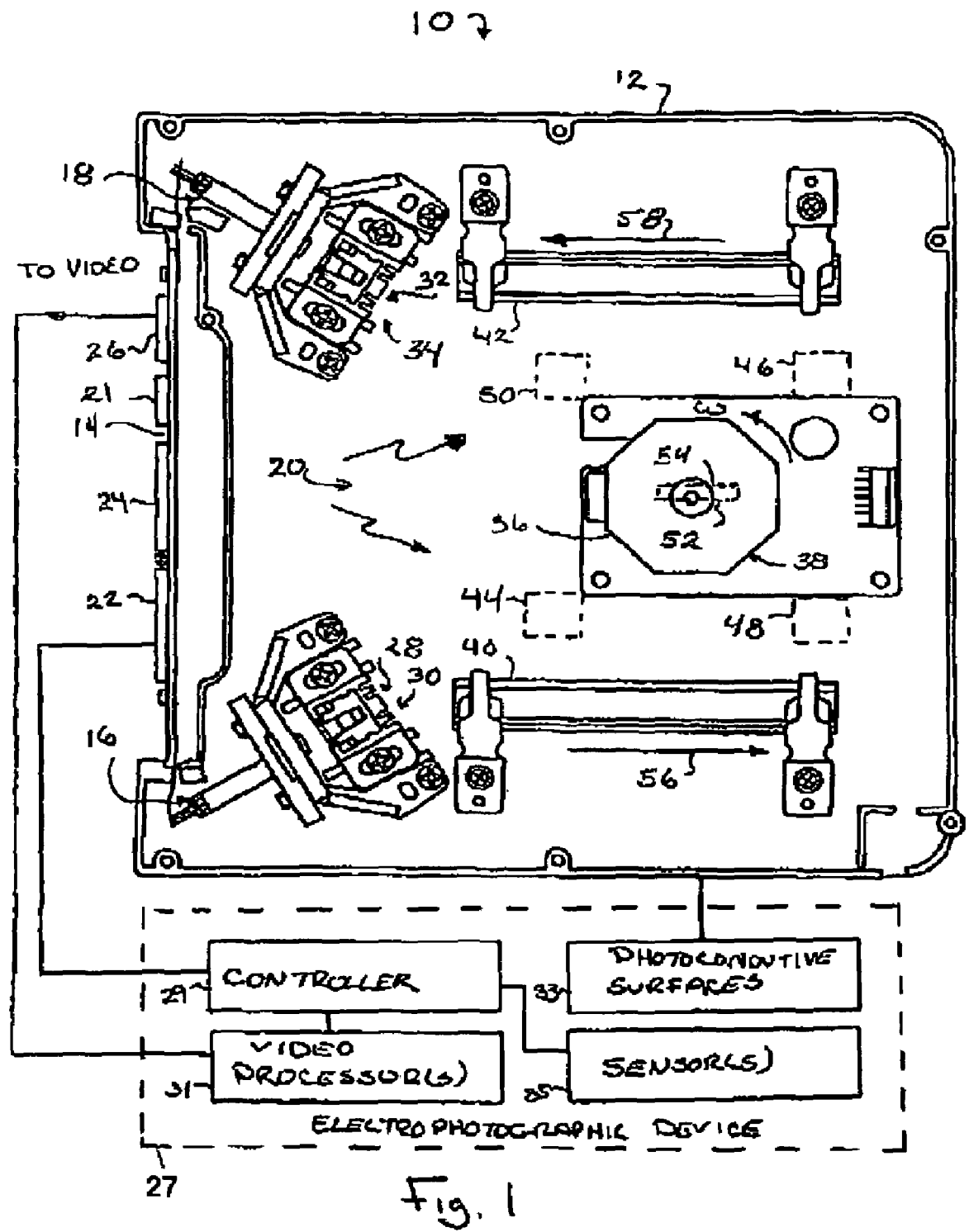
FIG. 1 is a top view of an optical scanner according to an embodiment of the present invention.

Referring to FIG. 1, an optical scanner 10, e.g., a printhead for a laser printer, includes generally, a housing 12, scanner circuitry 14, first and second laser assemblies 16, 18 and system optics 20. The scanner circuitry 14 provides electronics for driving lasers in each of the first and second laser assemblies 16, 18 including power management circuitry 21 for each laser. The scanner circuitry 14 further comprises a first interface 22 communicably coupled to a memory device 24, e.g., nonvolatile random access memory (NVRAM), and a second interface 26, which is provided for communicating laser data from one or more video processors in a corresponding electrophotographic device 27 to associated lasers in the first and second laser assemblies 16, 18.

The memory device 24 is operatively configured to store one or more operational parameters related to either the optical scanner 10, the corresponding electrophotographic device 27, or to both as will be explained in greater detail below. The first interface 22 e.g., implementing an I²C bus interface by Philips Semiconductors, may be coupled to a microprocessor or other control logic in the corresponding electrophotographic device 27 for communication with the memory device 24. A single interface could alternatively be used to both access the lasers in each of the first and second laser assemblies 16, 18 and access the memory device 24. However, having multiple interfaces 22, 26 allows a controller 29 in the electrophotographic device 27 to access (read from and optionally write to) the memory device 24 irrespective of the activity between the corresponding video processors of the electrophotographic device 27 and their associated lasers in the first and second laser assemblies 16, 18.

Video signals are communicated from video processors 31 in the electrophotographic device 27 through the second interface 26 to corresponding lasers in each of the first and second laser assemblies 16, 18. For a color device, such as that illustrated, there may be four lasers, two lasers in each of the first and second laser assemblies 16, 18. The first laser assembly 16 includes a first laser 28 associated with the cyan image plane and a second laser 30 associated with the magenta image plane. The second laser assembly 18 comprises a third laser 32 associated with the yellow image plane, and a fourth laser 34 associated with the black image plane. As shown, the first and second lasers 28, 30, are positioned in proximity to one another. Correspondingly, the third laser and fourth lasers 32, 34 are positioned in proximity to one another and are in spaced relation to the first and second lasers 28, 30.

The system optics 20 include a rotating polygonal mirror 36 having a plurality of facets 38 thereon, first and second fold down mirrors 40, 42, first and second start-of-scan pickoff mirrors 44, 46, first and second end-of-scan pick off mirrors 48, 50, and first and second start-of-scan/end-of-scan (SOS/EOS) detectors 52, 54. It is noted that the first and second start-of-scan pickoff mirrors 44, 46, first and second end-of-scan pick off mirrors 48, 50, and first and second start-of-scan/end-of-scan (SOS/EOS) detectors 52, 54 are shown in dashed lines to indicate that these components are actually attached to the housing 12 on the back side thereof opposite to the rotating polygonal mirror 36.

Each of the first and second lasers 28, 30 emits a corresponding laser beam so as to impinge upon the same one of the facets 38 of the polygonal mirror 36. The third and fourth lasers 32, 34 each emit a corresponding laser beam so as to impinge upon the same one of the facets 38 of the polygonal mirror 36. However, the facet 38 impinged by the first and second laser beams is different from the facet 38 impinged by the third and fourth laser beams. As the polygonal mirror 36 rotates at a rotational velocity ($\omega$), the angle of each laser beam with respect to a particular facet impinged thereby, changes causing each laser beam to sweep in a corresponding scan plane in the direction of rotation of the polygonal mirror 36. Accordingly, it can be observed that the first and second laser beams will sweep generally in a first scan direction as indicated by the first directional arrow 56 that is generally opposite of the second scan direction of the third and fourth beams, as indicated by the second directional arrow 58.

The first and second laser beams reflect off of the rotating polygonal mirror 36 and strike the first fold down mirror 40 that directs each of the first and second beams through the remainder of the system optics 20 (not shown), which may be required to focus or direct each laser beam. For example, additional post-scan optics may be required depending upon the manner in which the optical scanner 10 is positioned relative to associated photoconductive surface 33 of the electrophotographic device 27. As the first and second laser beams begin to sweep across their respective scan planes, energy from a select one of the first and second beams will impinge upon the first SOS pickoff mirror 44 and get reflected to the first SOS/EOS sensor 52. The output of the first SOS/EOS sensor 52 may thus be used as an indication of a start of scan for both of the first and second laser beams. Near the end of the associated scan line, energy from a select one of the first and second beams will reflect off the first EOS pickoff mirror 48 and get reflected to the first SOS/EOS sensor 52. The output of the first SOS/EOS sensor 52 may thus also be used as an indication of an end of scan for the first and second laser beams. The corresponding electrophotographic device 27 can differentiate between whether the signal output by the SOS/EOS sensor 52 represents a start of a scan line or the end of a scan line based upon the timing between successive SOS/EOS signals.

Correspondingly, the third and fourth laser beams reflect off of the rotating polygonal mirror 36 and strike the second fold down mirror 42 that directs each of the third and fourth beams through the remainder of the system optics 20 (not shown) as noted above. Further, as the third and fourth laser beams begin to sweep across their respective scan planes, energy from a select one of the third and fourth beams will impinge upon the second SOS pickoff mirror 46 and get reflected to the second SOS/EOS sensor 54. The output of the second SOS/EOS sensor 54 may thus be used as an indication of a start of scan for both of the third and fourth laser beams. Near the end of the scan line, energy from a select one of the third and fourth beams will reflect off the second EOS pickoff mirror 50 and get reflected to the second SOS/EOS sensor 54. The output of the second SOS/EOS sensor 54 may thus also be used as an indication of an end of scan for the third and fourth laser beams.

Due to constraints imposed in directing four beams in a single device, including the placement of the rotating polygonal mirror 36 and the first and second fold down mirrors 40, 42 with respect to each of the lasers 28, 30, 32, 34, it can be observed that the scan direction velocity of the corresponding laser beams will vary across their scan paths. Particularly, the scan direction velocity will be generally greater at the edge portions of each scan line, and relatively slower near the center portion of each scan line. Moreover, unavoidable imprecision in the shape and mounting of the system optics 20 with respect to the laser beams and/or associated photoconductive surfaces 33 in the corresponding electrophotographic device 27 can introduce process direction errors in the path of travel of a laser beam when writing across a scan line. As such, there may be bow associated with each laser beam. That is, the path of each laser beam in the scan direction may not maintain a straight line. It is also possible that a scan line written to a drum is not perpendicular to the movement of the print media due to laser misalignment and/or media misregistration thus causing a laser beam scan path to be skewed, i.e., the nominal scan direction is not perpendicular to the nominal process direction. To account for operational conditions such as bow, skew and other process direction position errors, and to compensate for scan line timing, laser beam scan path characterizing data is stored in the memory device 24 of the optical scanner 10 as described in greater detail below. An electrophotographic device 27 to which the optical scanner 10 is installed, can read this characterizing data and perform electronic corrections to compensate for the inherent, non-ideal operational conditions.

Also, it is noted that in an electrophotographic device 27, each scanning laser beam writes to a corresponding photoconductive surface 33, e.g., a photoconductive drum. The amount of toner applied to the drum, and correspondingly the print media, is highly sensitive to the amount of optical energy applied to the drum by the associated laser beam. Thus, the overall print quality is sensitive to the optical output of the lasers 28, 30, 32, 34. However, optical power requirements are known to vary widely from laser diode to laser diode (as much as 100% or more). To account for such variations, select parameters related to laser beam power are characterized and also stored on the memory device 24 of the optical scanner 10. This characterizing data can be utilized by an electrophotographic device 27 for electronic correction and/or calibration of laser power functions.

A more detailed description of an exemplary electrophotographic device 27 in which the optical scanner 10 of the present invention can be used is set out and described in referenced U.S. patent application Ser. No. 10/808,155, filed on Mar. 24, 2004, entitled "Electronic Systems And Methods For Reducing Laser Beam Process Direction Position Errors."

Memory on the Optical Scanner

Identification Parameters

One type of information that may be useful to store in the memory device 24 relates to identification of the optical scanner 10, and validation of the data stored thereon. A data definition for some exemplary identification data is set out in Table 1 below. As can be seen, a version number and serial number, or like identifying types of information may be stored in the memory device 24. The electrophotographic device 27 may use this identification information as a check to ensure that it is properly interpreting the contents of the memory device 24. The information in Table 1 may also be used to identify the optical scanner 10 for evaluation purposes, such as if the optical scanner 10 is removed from a corresponding electrophotographic device 27 for servicing. A checksum may also be provided so that the corresponding electrophotographic device 27 can ascertain whether there has been a corruption of the data stored in the memory device 24.

TABLE 1

| | Identification | |
|---|---|---|
| Name | Exemplary Size | Description |
| Version | 1 | |
| Serial Number | 12 | ASCII S/N: "byte 0, byte 1, byte 2, . . . byte N" |
| Checksum | 4 | Sum of all bytes excluding checksum in device |

History Parameters

The first interface 22 of the optical scanner 10 preferably allows a controller or other device in the corresponding electrophotographic device 27 to write as well as to read to the memory device 24 of the optical scanner 10. This allows the electrophotographic device 27 the capability to use the memory device 24 as a storage area for historical and archival/backup purposes. Examples of data definitions for historical and archival information are set out in Tables 2A and 2B below. The historical information in Table 2A provides pre-allocated memory spaces that may be written to by the corresponding electrophotographic device 27 to keep track of operating conditions. The historical information is not necessary for operation, but may provide an insight into the performance of the corresponding electrophotographic device 27 and/or the optical scanner 10 should the optical scanner 10 need to be serviced or replaced. For example, the controller 29 may record the power on seconds and/or start cycles for the electrophotographic device 27 or for specific components in the electrophotographic device 27. The serial number of the corresponding electrophotographic device 27 to which the optical scanner 10 is installed may also be recorded. Additionally, the memory device 24 may be used to store data read from one or more sensors 35. For example, the sensor 35 may comprise a temperature sensing device that senses temperature readings within the electrophotographic device 27, which may include measuring the temperature of a specific component, such as the optical scanner 10. The stored temperature data can then be extracted from the memory device 24 for diagnostics, statistical purposes and trend analysis.

TABLE 2A

History

| Name | Description |
| --- | --- |
| Power On Seconds | Recorded at the end of each print job. |
| Start Cycles | Recorded at the end of each print job. |
| Last Machine S/N | Written with S/N if it does not match stored value. |
| Max P/H Temp | Maximum printhead temperature. |
| Checksum | |

The memory device 24 may also be used to archive or otherwise store a backup or copy of data that would otherwise reside on another component of the corresponding electrophotographic device 27. Under this arrangement, should a component such as the controller require replacing, the newly installed replacement component can access the memory device 24 in the optical scanner 10 to retrieve the necessary registration/adjustment/calibration data. Still further, the electrophotographic device 27 may need to read data from the memory device 24, modify, append, delete or otherwise manipulate the data and store the results back out to the memory device 24. This capability is facilitated by reading from, and writing to, the memory device 24 and corresponding first interface 22. An example of archival data that may be stored in the memory device 24 on the optical scanner 10 is color image plane registration data. Exemplary data definitions for registration data is set out in Table 2B below.

TABLE 2B

Registration

| Name | Units | Description |
| --- | --- | --- |
| Tb | Scans | Top Black Offset |
| Lb | Slices | Left Black Offset |
| Rb | Slices | Right Black Offset |
| Bb | Scans | Bottom Black Offset |
| Tdb | Scans | Duplex Black Offset |
| Zb | Scans | Skew Black Offset |
| Pb | Scans | Bow Black Offset |
| Tc | Scans | Top Cyan Offset |
| Lc | Slices | Left Cyan Offset |
| Rc | Slices | Right Cyan Offset |
| Zc | Scans | Skew Cyan Offset |
| Pc | Scans | Bow Cyan Offset |
| Tm | Scans | Top Magenta Offset |
| Lm | Slices | Left Magenta Offset |
| Rm | Slices | Right Magenta Offset |
| Zm | Scans | Skew Magenta Offset |
| Pm | Scans | Bow Magenta Offset |
| Ty | Scans | Top Yellow Offset |
| Ly | Slices | Left Yellow Offset |
| Ry | Slices | Right Yellow Offset |
| Zy | Scans | Skew Yellow Offset |
| Py | Scans | Bow Yellow Offset |

In practice, the registration data would be entered into the electrophotographic device 27 during an image alignment process or calibration procedure e.g., as part of a manufacturing process or during a field calibration of the optical scanner 10. The registration data may be entered into the electrophotographic device 27 via a computer or some other electronic device, or the registration data can be entered manually using inputs provided on the operator panel of the electrophotographic device 27. Thereafter, a controller in the electrophotographic device 27 may mirror the registration data to the memory device 24 on the optical scanner 10 for backup purposes. Thus, if a component in the electrophotographic device 27 fails (other than the optical scanner), the necessary image calibration data can be retrieved from the memory device 24 on the optical scanner 10 without the need to implement an image alignment process.

As an example, one or more test sheets can be printed out from the electrophotographic device 27. The registration sheets may contain indicia such as arrows, boxes, symbols, characters or other markings that allows image analysis. e.g., an inspection, either visual by an operator, or via electronics such as by scanning the test sheet. From an analysis of the indicia on the test sheets, data conforming to the registration data definitions set out in Table 2B (or any other data definitions) may be entered into the electrophotographic device 27. As shown in Table 2B, there are several values entered for the black image plane, including top, left, right and bottom offsets. If the electrophotographic device 27 supports duplex printing, a separate data field may be provided for duplex offset of the black image plane. Data may also be provided to characterize bow and skew for the black image plane. As shown in Table 2B, data having a unit of Scans represents a number of scan lines at a predetermined resolution. Data having a unit of Slices represents a number of slices or slice clock pulses, i.e., a fraction of a Pel. The relationship between slices and Pels is described in in U.S. patent application Ser. No. 10/808,130, filed on Mar. 24, 2004, entitled "System For Performing Laser Beam Linearity Correction And Algorithms And Methods For Generating Linearity Correction Tables From Data Stored In An Optical Scanner".

There are also data locations allocated for top, left, right, skew and bow for each of the cyan, magenta and yellow color image planes, which may each independently be registered to the previously adjusted black image plane. The printer controller may optionally make electronic adjustments to the entered registration data such that a modification of one parameter does not significantly affect the other parameters. For example, if an operator enters in a left margin adjustment, the controller in the electrophotographic device may make the necessary corrections to the line length so that the right margin is not adversely affected by the left margin adjustment.

As noted above, each of the cyan, magenta and yellow image planes register to black. As such, it may be desirable to implement a registration adjustment control scheme such that each unit measure of adjustment for at least select ones of the black image plane parameters are coarse relative to similar unit of measure adjustments for the cyan, magenta and yellow image planes. As noted in Table 2B, top offset, skew and bow for each color image plane, and duplex and bottom for the case of the black image plane, are expressed in scan lines at a predetermined resolution. Each unit of correction (in scan lines) may be relatively more coarse for the black image plane than for the cyan, magenta and yellow image planes. For example, the top margin adjustment for black may be set to a resolution of multiple scan lines, e.g., four or more, per increment, and the corresponding resolution of adjustments for the cyan, magenta and yellow image planes may be made set to increments of one scan line or less. Similarly, the resolution of the left and right margin for the black image plane may be expressed in Pels, and correspondingly, the left and right correction for each of the cyan, magenta and yellow image planes may be expressed in slices where a slice represents a predetermined fraction of a Pel.

The data entered during the image alignment processes may be an extension to the range of adjustments already provided by the electrophotographic device 27. For example, the bow and skew data from Table 2B may be integrated into the source address list entry instructions or other profile data for performing electronic correction of process direction position errors as set out entitled "Algorithms And Methods For Determining Laser Beam Process Direction Position Errors From Data Stored On A Printhead" and referenced U.S. patent application Ser. No. 10/808,155, filed on Mar. 24, 2004. entitled "Electronic Systems And Methods For Reducing Laser Beam Process Direction Position Errors." Similarly, the left margin data for each color image plane may be used to establish, for example, an offset to a nominal detect-to-print time, or may otherwise be used in the determination of the detect-to-print time for each corresponding image plane. Also, the right margin data for each color image plane may be used, for example, to perform line length rotation/adjustment as set out in U.S. patent application Ser. No. 10/808,130, filed on Mar. 24, 2004, entitled "Systems For Performing Laser Beam Linearity Correction And Algorithms And Methods For Generating Linearity Correction Tables From Data Stored In An Optical Scanner".

Manufacturing Parameters.

The memory device 24 also may be used to store manufacturing related operational parameters of the optical scanner 10, examples of which are set out in Tables 3A and 3B below.

TABLE 3A

Manufacturing

| Name | Units | Size (Bytes) | Description |
|---|---|---|---|
| Xb | microns | 4 | X Offset from origin to black coordinate system |
| Yb | microns | 4 | Y Offset from origin to black coordinate system |
| Black X Vector | microns | 30 | X vector for black, value 0 is wrt Xb, Yb |
| Black Y Vector | microns | 30 | Y vector for black |
| Black A Vector | Δ degrees | 30 | Delta angle vector for black wrt to SOS |
| Black Nominal DetToPrt | Δ degrees | 2 | Nominal DetToPrt wrt to SOS in degrees * 8192 |
| Xm | microns | 4 | X Offset from origin to mag coordinate system |
| Ym | microns | 4 | Y Offset from origin to mag coordinate system |
| Magenta X Vector | microns | 30 | X vector for mag, value 0 is wrt Xm, Ym |
| Magenta Y Vector | microns | 30 | Y vector for mag |
| Magenta A Vector | Δ degrees | 30 | Delta angle vector for mag wrt to SOS. |
| Magenta Nominal DetToPrt | Δ degrees | 2 | Nominal DetToPrt wrt to SOS in degrees * 8192 |
| Xc | microns | 4 | X Offset from origin to cyan coordinate system |
| Yc | microns | 4 | Y Offset from origin to cyan coordinate system |
| Cyan X Vector | microns | 30 | X vector for cyan, value 0 is wrt Xc, Yc |
| Cyan Y Vector | microns | 30 | Y vector for cyan |
| Cyan A Vector | Δ degrees | 30 | Delta angle vector for cyan wrt to SOS |
| Cyan Nominal DetToPrt | Δ degrees | 2 | Nominal DetToPrt wrt to SOS in degrees * 8192 |
| Xy | microns | 4 | X Offset from origin to yellow coordinate system |

TABLE 3A-continued

Manufacturing

| Name | Units | Size (Bytes) | Description |
|---|---|---|---|
| Yy | microns | 4 | Y Offset from origin to yellow coordinate system |
| Yellow X Vector | microns | 30 | X vector for yellow, value 0 is wrt Xy, Yy |
| Yellow Y Vector | microns | 30 | Y vector for yellow |
| Yellow A Vector | Δ degrees | 30 | Delta angle vector for yellow wrt to SOS |
| Yellow Nominal DetToPrt | Δ degrees | 2 | Nominal DetToPrt wrt to SOS in degrees * 8192 |
| Xs | uM | 2 | Printhead Datum Offset wrt Image System |
| Ys | uM | 2 | Printhead Datum Offset wrt Image System |
| CM SOS to EOS | ns | 4 | Cyan/Magenta SOS to EOS |
| KY SOS to EOS | ns | 4 | Black/Yellow SOS to EOS |

Table 3A illustrates exemplary data that may be used to characterize each non-ideal laser beam scan path. The corresponding electrophotographic device 27, e.g., a color laser printer, may effect electronic compensation based upon the data that characterizes each non-ideal laser beam scan path, such as to minimize color hue shifts and other print artifacts, adjust color mis-registration including skewed color planes, and compensate for graininess by electronically compensating for process direction position errors including bow and skew and/or by electronically compensating for laser beam scan velocity nonlinearity. Table 3B illustrates exemplary data that may be used to characterize laser power requirements and operational parameters to achieve more reliable timing and improved quality in print density.

Characterizing Each Laser Beam Scan Path

The corresponding electrophotographic device 27 can access the data stored in the memory device 24 of the optical scanner 10 as set out in Table 3A to correct for scan line linearity, as set out in referenced U.S. patent application Ser. No. 10/808,130, entitled "Systems For Performing Laser Beam Linearity Correction And Algorithms And Methods For Generating Linearity Correction Tables From Data Stored In An Optical Scanner". The electrophotographic device 27 may also use data that is stored in the memory device 24 of the optical scanner 10 as set out in Table 3A to correct for laser beam process direction position errors including bow and/or skew as set out in referenced U.S. patent application Ser. No. 10/807,870, entitled "Algorithms And Methods For Determining Laser Beam Process Direction Position Errors From Data Stored On A Printhead" and referenced U.S. patent application Ser. No. 10/808,155, entitled "Electronic Systems And Methods For Reducing Laser Beam Process Direction Position Errors."

The characterizing data also enables more efficient field replacement of the optical scanner 10. The system controller of the corresponding electrophotographic device 27 can read the memory device 24 on the newly installed optical scanner and derive information that characterizes the new laser beam scan paths and power requirements based at least in part upon the information read from the memory device 24. Registration information and other parameters can then be configured to accommodate the new optical scanner that has been installed. The characterizing data is preferably unique to the particular optical device. However, the characterizing data may alternatively be generalized based upon tests and/or measurements taken on similar optical scanners, such as a sample optical scanner drawn from a manufactured lot of similar optical scanners. That is, the characterizing data may be measured from one optical scanner, and the results from the measured optical scanner may be stored in the memory device of a second optical scanner.

Laser Beam Scan Path Test Points

Figure 2:
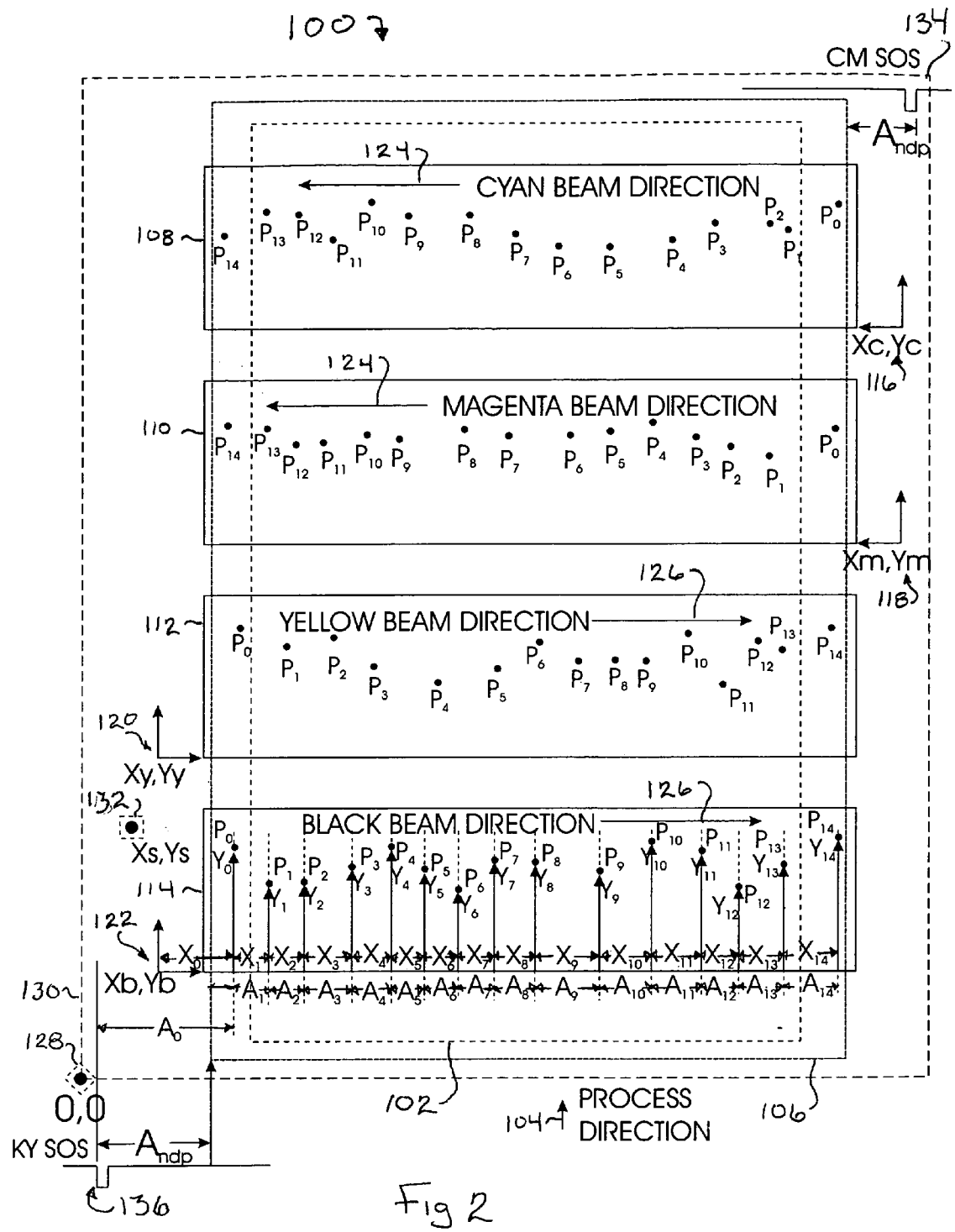
FIG. 2 is a schematic view of a laser scanning system from the perspective of a printhead looking onto a print medium.

The data stored in Table 3A is best understood by referring first, to a laser scanning system 100 illustrated in FIG. 2, which schematically represents the system 100 from the perspective of the optical scanner 10 looking onto a print medium. Typically, each laser beam of the optical scanner 10 writes to a corresponding photoconductive surface 33 such as a drum. However, for purposes of clarifying the principles of the present invention, FIG. 2 shows each laser writing directly to a print medium 102 represented by a dashed box. The print medium 102 is assumed to move up in FIG. 2 in a process direction, as illustrated by the directional arrow 104. Notably, the width of the print medium 102, e.g., a typical sheet of letter-sized paper, is less than the maximum writeable area of the corresponding laser beams as indicated by the dashed box 106.

Since each laser beam is likely to exhibit a non-ideal laser beam scan path, e.g., process direction position errors including bow and skew, a cyan scan plane 108, a magenta scan plane 110, a yellow scan plane 112 and a black scan plane 114 are illustrated to represent planes that bound their associated laser beam scan path. Each scan plane 108, 110, 112, 114 is associated with a corresponding, arbitrarily positioned, local beam position origin 116, 118, 120 and 122.

The beam position origins 116, 118, 120 and 122 are provided for convenience and allow scan path measurements taken in each corresponding scan plane 108, 110, 112, 114 to be referenced relative to a local coordinate system. It may be convenient to select a position for each of the beam position origins 116, 118, 120 and 122 in a manner that minimizes or eliminates the need to store and manipulate negative numbers, or to otherwise meet the storage requirements for a particular implementation of the present invention.

As shown, the process direction 104 is the same for all of the scan planes 108, 110, 112, 114. However, the cyan and magenta laser beams traverse generally in a first scan direction 124, illustrated in FIG. 2 as traversing across the page from the right to the left. The yellow and black laser beams traverse generally in a second scan direction 126, which is generally opposite to the first scan direction. These scan direction orientations correspond to the respective direction 56, 58 in which the corresponding laser beams impinge the corresponding rotating polygon mirror 36 as illustrated in FIG. 1.

It may be desirable to describe the location of each of the beam position origins with respect to an arbitrary image system origin 128. An image system plane 130, represented by a dashed box in FIG. 2 encompasses each of the cyan, magenta, yellow and black scan planes 108, 110, 112, 114. The image system plane 130 thus defines a global coordinate system relative to each of the local beam position origins 116, 118, 120 and 122. Again, the location of the image system origin 128 can be completely arbitrary. As shown, the coordinates of the cyan beam position origin 116 with respect to the image system 128 origin is Xc,Yc. The coordinates of the magenta beam position origin 118 with respect to the image system origin 128 is Xm,Ym. Similarly, the coordinates of the yellow beam position origin 120 with respect to the image system origin 128 is Xy,Yy, and the coordinates of the black beam position origin 122 with respect to the image system origin 128 is Xb,Yb.

A correlation is also established between the optical scanner 10 and each of the scan planes 108, 110, 112, 114 by defining an optical scanner origin 132, i.e., a known, fixed point arbitrarily selected in the optical scanner 10. For convenience, the optical scanner origin 132 may be selected as a datum location on the housing 12. However, any other position may alternatively be used. As shown, the optical scanner origin 132 is positioned at coordinates Xs, Ys with respect to the image system origin 128.

A plurality of test points, e.g., fifteen test points, labeled $P_0$–$P_{14}$ as shown, are detected and recorded at various locations across each scan plane 108, 110, 112, 114. The test points $P_0$–$P_{14}$ represent measurements recorded of the actual laser beam position as each laser swept across its corresponding scan plane. The number of test points and the interval(s) upon which the test points are taken can vary. For example, the number of measurements corresponding to each test point may be dependent upon the available system resources (e.g., the amount of memory allocated to store the test point data on the memory device 24 of the optical scanner 10), or a desired level of precision by which the process direction position errors of written Pels are to be characterized. Also, any suitable unit of measure, e.g., microns, millimeters, etc. may be used to record the first and second measurements for each of the test points $P_0$–$P_{14}$.

For ease of description, the remainder of the discussion herein will be directed primarily towards a discussion of the black scan plane 114. However, the discussion applies analogously to the cyan, magenta and yellow scan planes 108, 110, 112 with notable differences identified. First and second measurements for the test point $P_0$ are expressed as Cartesian X, Y coordinates, where $X_0$ represents the distance that test point $P_0$ lies from the black beam position origin 122 in the scan direction 126 and $Y_0$ represents the distance that test point $P_0$ lies from the black beam position origin 122 in the process direction 104. The scan direction 126 (X-axis) measurements for the remainder of the test points $P_1$–$P_{14}$, may be taken relative to the preceding test point. For example, the scan direction measurement $X_j$ recorded for the corresponding test point $P_j$, may be recorded as the distance in the scan direction that test point $P_j$ lies from test point $P_{j-1}$, etc. This approach is not required to practice the present invention, but it does reduce the amount of space necessary to store the scan direction position measurements for each scan plane in the memory device 24. Alternatively, each test point $P_0$–$P_{14}$ may be expressed relative to the black beam position origin 122 or any other reference.

Based upon the process and scan direction beam position measurements (X,Y) of the test points $P_0$–$P_{14}$ for a given scan plane 108, 110, 112, 114, it is possible to construct a corresponding laser beam scan path model that characterizes the scan path of the corresponding laser beam. However, the location of a written Pel along a scan path may be affected by a number of factors including laser beam scan velocity nonlinearity and printer registration data.

To compensate for laser beam scan velocity nonlinearity and registration data, a third measurement on each of the test points $P_0$–$P_{14}$ may be taken. One exemplary way to encode scan line velocity into the test points $P_0$–$P_{14}$ is to measure the scan direction position of each of the above described test points $P_0$–$P_{14}$ as a function of the angular position of the polygonal mirror 36. An angle $A_0$ corresponds to an angular change of the rotating polygonal mirror 36 as the laser beam corresponding to the black scan plane 114 crosses the first test point $P_0$ relative to a fixed and known point, such as the angular position of the rotating polygonal mirror 36 at the associated start-of-scan signal 136. The angles $A_1$–$A_{14}$ are similarly measured, and may be recorded relative to the preceding angle measurement as noted above for the scan direction measurements to reduce storage requirements. That is, $A_j$ may be stored as the change in the angle of the rotating polygonal mirror 36 relative to $A_{j-1}$, etc. Alternatively, each angle may be recorded relative to the start-of-scan signal 136 or other known reference.

A single start-of-scan signal 134 is provided for the laser beams corresponding to the cyan and magenta scan planes 108, 110, which is designated herein as CM SOS. The CM SOS signal is detected by sensing a signal from the first SOS/EOS sensor 52, which is generated when the first SOS/EOS sensor 52 detects a signal from the first SOS pickoff mirror 44. Correspondingly, a single start-of-scan signal 136 is provided for the laser beams corresponding to the yellow and black scan planes 112, 114, which is designated herein as KY SOS. The KY SOS signal is detected by sensing a signal from the second SOS/EOS sensor 54, which is generated when the second SOS/EOS sensor 54 detects a signal from the second pickoff mirror 46.

With reference to the black scan plane 114, a predetermined amount of time after detecting the start-of-scan signal 136, i.e., when a detect-to-print time has expired, a detect-to-print signal is provided. The detect-to-print signal indicates that the laser beam associated with the black scan plane 114 has reached a position corresponding to the first edge of a print medium, which is designated Pel 0 (not shown in FIG. 2). Each scan plane 108, 110, 112, 114 may have associated therewith, a unique detect-to-print time, designated herein generally as $DetToPrint_{(time)}$. The detect-to-print time $DetToPrint_{(time)}$ corresponding to each scan plane is a function of an associated nominal detect-to-print time $DetToPrint_{(nominal)}$ as modified by registration data stored in the device, which is used to derive a corresponding offset $DetToPrint_{(offset)}$.

It may be convenient to store each nominal detect-to-print time $DetToPrint_{(nominal)}$, and correspondingly, the nominal location of Pel 0, as an angle measurement ($A_{ndp}$) with respect to a known, fixed point, e.g., the corresponding start of scan sensor and an inherently known location of the laser beam when it actuates the start of scan sensor. Thus:

$$A_{ndp} = \omega_{polygonalmirror} \times DetToPrint_{(nominal)}$$

where $\omega_{polygonalmirror}$ is the rotational velocity of the polygonal mirror 36.

The beam position measurements (test points $P_0$–$P_{14}$) from each of the scan planes 108, 110, 112, 114 can be freely mapped between their respective local coordinate systems, to a coordinate system based relative to the optical scanner origin 132. It is also noted that the use of the beam position origins 116, 118, 120, 122 are for convenience and to reduce the necessary storage requirements of the beam position measurements. The beam position measurements may alternatively be stored relative to the optical scanner origin 132 or other known reference location.

Beam Position Measurement Data

Table 3A is merely illustrative of the manner in which the beam position measurements (discussed above) may be stored. Table 3A includes entries for the coordinates of each local beam position origin 116, 118, 120, 122 relative to the image system origin 128 and corresponding beam position measurements (X, Y and Angle for each corresponding test point $P_0$–$P_{14}$). The X, Y and Angle measurements for each of the test points $P_0$–$P_{14}$ for each color scan plane 108, 110, 112, 114 are encoded into two byte values and the associated fifteen 2-byte values are assembled into a vector. That is, the fifteen corresponding X-axis values are concatenated into a single, 30-byte vector for each scan plane 108, 110, 112, 114. Similarly, the process direction (Y-axis) measurements and the Angle measurements are also encoded into 30 byte vectors for each color image plane. Table 3A also stores the rotating polygonal mirror 36 angular position $A_{ndp}$ corresponding to the nominal detect-to-print time for each scan plane, the coordinates of the optical scanner origin 132 as an offset from the image system origin 128, and the time period between each of the corresponding start of scan and end of scan (EOS) signals for CM SOS and KY SOS.

The Laser Beam Scan Path Test Device

Figure 3:
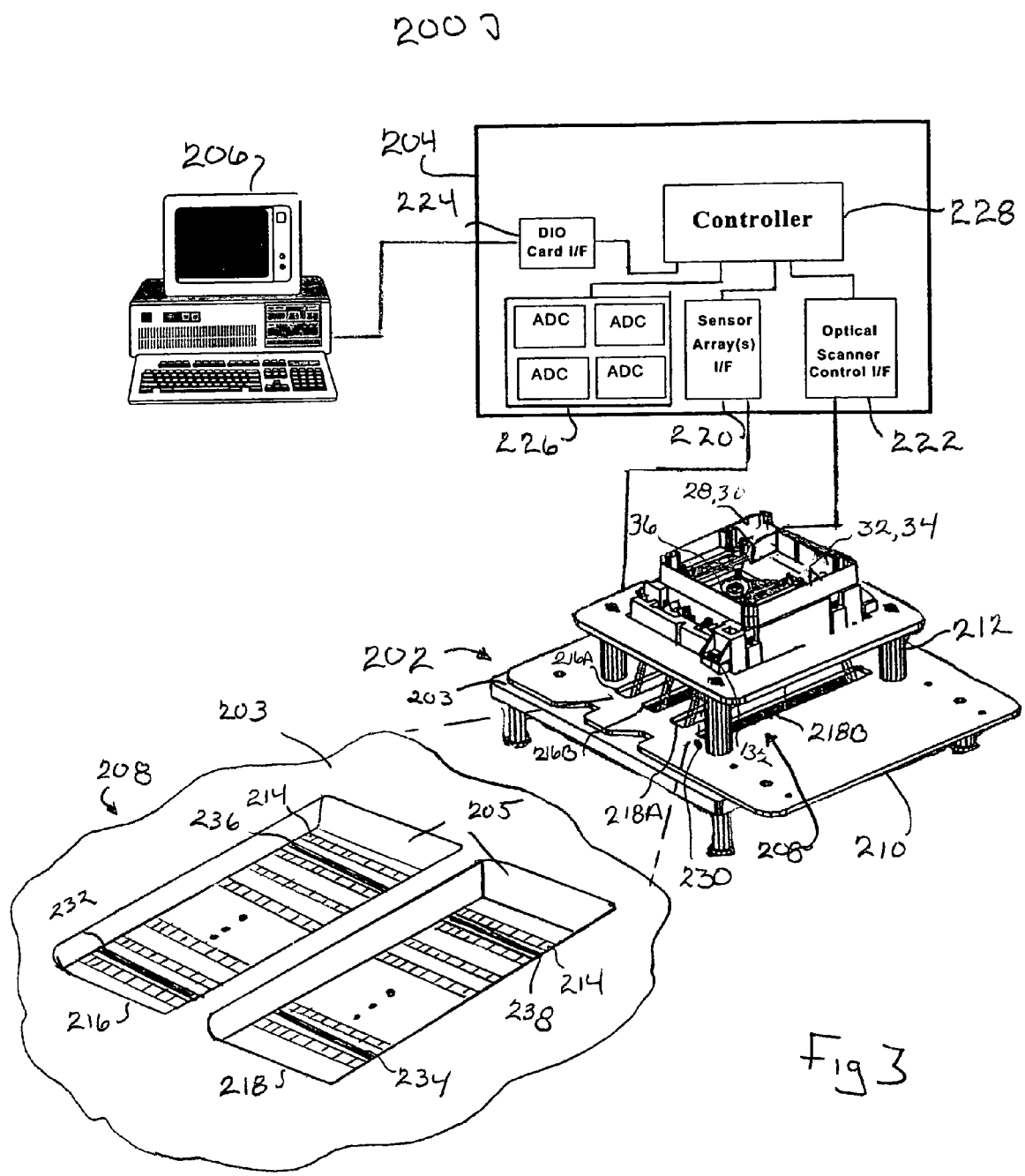
FIG. 3 is a schematic representation of a first test fixture for deriving characterizing data that is stored on a memory device of the optical scanner shown in FIG. 1.

To determine the laser beam scan path measurements for test points $P_0$–$P_{14}$ identified in Table 3A, the optical scanner 10 may be installed in a first test fixture 200 as illustrated in FIG. 3. The first test fixture 200 includes a scanning table 202, an interface 204 and a computer 206. The interface 204 is communicably coupled to the scanning table 202, the optical scanner 10 (when installed on the first test fixture 200), and the computer 206.

The scanning table 202 includes a surface 203 having a pair of wells or depressions 205 therein defining a sensing area 208 for sensing laser energy emitted by the lasers 28, 30, 32, 34 in the optical scanner 10 and may be built to include features and constraints similar to those of an actual electrophotographic device 27 for which the optical scanner 10 is to be used. An optional adapter 210 and a mounting system 212 may also be provided for temporarily supporting the optical scanner 10 with respect to the scanning table 202 for testing. Although optional, the adapter 210 and mounting system 212 provide flexibility in interfacing different configurations of optical scanners to the first test fixture 200.

The sensing area 208 includes a plurality of sensor arrays 214, e.g., charge couple device (CCD) sensor arrays. The sensor arrays 214 may be evenly spaced or spaced at random intervals across the laser beam scan path. Each sensor array 214 contains a plurality of individually detectable cells. For example, each sensor array 214 may be arranged as a linear column of cells or in a multidimensional arrangement of cells. In one illustrative embodiment of the present invention, there are thirty sensor arrays 214 organized into two banks 216, 218 of fifteen sensor arrays 214 each. Each sensor array 214 comprises a linear column that includes 1,280 cells spaced apart from one another on 63.5 micrometer centers. Of course, other arrangements may be used. Each cell may have associated therewith, a signal integrator and sample and hold circuit or other circuitry necessary to allow an external device to access a measure, e.g., a voltage, of the intensity of light that impinged upon that cell. The built-in logic of each sensor array 214 may also have the capability to clear or reset the integrators, sample and hold circuits or other logic in the sensor arrays 214.

Each bank 216, 218 of fifteen sensor arrays 214 is associated with two laser beams in the optical scanner 10 when an optical scanner is installed over the scanning table 202. For example, the first and second lasers corresponding to the magenta and cyan image planes may be associated with the first bank 216 of fifteen sensor arrays 214, and the third and fourth lasers, corresponding to the yellow and black image planes may be associated with the second bank 218 of fifteen sensor arrays 214. While illustrated with two banks 216, 218, other configurations are also possible. For example, only one bank may be necessary, such as for mono optical scanners or where the lasers in the optical scanner are tested one at a time. Alternatively, a bank may be provided for each laser in a corresponding optical scanner, and as such, the sensing area 208 may include more than two banks of sensor arrays 214.

It is noted that the sensor arrays 214 in each bank 216, 218 may be much larger than the process direction position errors of a given laser beam. As such, each laser beam in the optical scanner under test may be allocated to a limited region of the corresponding sensor arrays 214. Notably, the optional adapter 210 includes four slots 216A, 216B, 218A, 218B. The slots 216A and 216B divide the first bank 216 into two sections lengthwise along the first scan direction. Similarly, the slots 218A, 218B divide the second bank 218 into two sections lengthwise along the second scan direction. For example, the first laser corresponding to the cyan image plane may direct a corresponding scan beam through slot 216A, and thus direct laser energy that may impinge only on a limited range of each of the sensor arrays 214 in the first bank 216. Similarly, the magenta, yellow and black image planes may each direct a corresponding laser beam through an associated one of the slots 216B, 218A, and 218B and thus direct laser energy that may impinge only on a limited range of each of the sensor arrays 214 in their corresponding banks.

The interface 204 comprises a sensor array interface 220, an optical scanner interface 222, a host computer interface 224, analog to digital conversion circuitry 226 and a controller 228. The sensor array interface 220 enables communication between the interface 204 and the sensor arrays 214 on the scanning table 202 so that laser beam measurements can be read from the sensing area 208. Similarly, the optical scanner interface 222 allows communication between the interface 204 and the optical scanner 10 under test for control of the scanner, and the host computer interface 224 allows communication between the interface 204 and the computer 206. The interface 204 is configured such that commands from the computer 206 received through the host computer interface 224 can be used to selectively control the optical scanner 10 under test via the optical scanner interface 222. Likewise, information read from the sensing area 208 of the scanning table 202 via the sensor array interface 220 can be communicated to the computer 206 through the host computer interface 224. The interface 204 may be provided as device integral to the computer 206, as a hardware device external to the computer 206 and the scanning table 202, or integral with the scanning table 202.

The analog to digital conversion circuitry 226 is optional and may alternatively be provided elsewhere with respect to the first test fixture 200. For example, such conversion functionality may be provided by the scanning table 202 or in an appropriate interface card installed with respect to the computer 206. The analog to digital conversion circuitry 226 is provided for converting the data read from each of the sensor arrays 214 to a digital format suitable for processing by the computer 206. For example, four, 8-channel 12-bit high-speed analog to digital converters (ADCs) may be configured such that each one of the thirty sensor arrays 214 is associated with a select channel of one of the ADCs.

The controller 228 includes logic that enables the interface 204 to control the operation of the optical scanner 10 under test. The controller 228 may comprise, for example, a field programmable gate array (FPGA) or other appropriate logic, and is provided for communication with the scanning table 202 via the sensor array interface 220, the optical scanner under test via the optical scanner interface 222, the computer 206 via the host computer interface 224, and analog to digital conversion circuitry 226. The operational parameters to be controlled will likely depend upon the tests to be performed on the optical scanner 10. For example, in one working embodiment of the present invention, the controller 228 can control a plurality of optical scanner functions including operation of the mirror motor, energy management system (EMS) feedback, power boost modulation, laser power control, laser servo, scan timing control, and laser pulse generation. However, other control arrangements are possible.

During testing, software on the computer 206 commands the controller 228 through the interface 204 to control the optical scanner 10 such that various tests are performed. The data from those tests is collected by the interface 204 and is communicated to the computer 206. The computer 206 performs any necessary calculations on the data to characterize the operation of the optical scanner 10 under test, and then instructs the interface 204 to write the characterizing information to the memory device 24 on the optical scanner 10 under test. For example, software on the computer 206 (via the interface 204) may command the optical scanner under test to output light pulses of various lengths and at various points in the scan path of each laser in the optical scanner 10. These programmed pulses will radiate onto the associated bank 216, 218 of sensor arrays 214. The analog to digital conversion circuitry 226 may be used to convert the analog measurements, e.g., integrated voltage of each cell in the sensor arrays 214, to digital measurements that the controller 228 relays to the computer 206 for processing. This sequence of operations can be repeated as commanded by the software on the computer 206 for each desired test.

As noted with reference to FIG. 2, the test points $P_0$–$P_{14}$ for each color scan plane can be freely mapped between their corresponding local origins and the optical scanner origin 132. To associate the schematic illustration of FIG. 2 to the first test fixture 200, the optical scanner origin 132 is mapped to a test fixture origin 230 on a surface of the first test fixture 200. Once the test fixture origin 230 is established, each cell in each of the sensor arrays 214 can be located in the coordinate space of FIG. 2. One exemplary way to map each cell is to precisely measure the beginning and ending cells in each sensor array 214. Such an approach allows the software executed by the computer 206 to account for any skew evident between the orientation of the optical scanner under test and each of the sensor arrays 214. Where each of the sensor arrays 214 comprises a two-dimensional area of cells, the coordinates of at least two corner cells are measured. Knowing the number of cells per sensor array 214, the spacing between cells, and the coordinates of the beginning and ending cells (or at least two corner cells), each cell location in the corresponding sensor array 214 can be located using standard geometry.

Also as noted above, each of the four laser beams of the optical scanner 10 under test sweeps across fifteen of the thirty sensor arrays 214 so that data can be obtained relative to 15 columnar locations across the scan paths of each laser beam. Using signals generated at these 15 columnar locations, inherent bow, skew and linearity errors of each optical beam path may be determined. The measured test points $P_0$–$P_{14}$ are characterized by three vectors that include the scan direction position (X-axis in FIG. 2) and the process direction position (Y-axis in FIG. 2) measurements of a corresponding laser beam as it crosses each of the fifteen sensor arrays 214, and an angle measurement of a facet of the rotating polygonal mirror 36 that is struck by the laser beam relative to a known, fixed reference, e.g., the start of scan signal, an example of which is set out in Table 3A.

For convenience, the scan direction measurements (X-vectors) are stored as offsets from the previously measured sensor array 214. Of course, absolute measurements may also be recorded if memory constraints allow. Further, although each laser beam scan path position measurement recorded by the first test fixture 200 is stored with respect to its corresponding beam system origin 116, 118, 120, 122 in the example given with respect to FIG. 2, the measurements may also be stored with respect to other frames of reference, e.g., with reference to the optical scanner origin 132 or other frame of reference. Similarly, the process direction measurements and the rotating polygonal mirror angle measurements may be stored as relative offsets or absolute measurements.

In order to find the scan direction (X-axis) and the process direction (Y-axis) locations for a given beam, the software executed by the computer 206 instructs the optical scanner 10 under test via the interface 204 to radiate the select laser beam across each of the associated sensor arrays 214 in a corresponding bank 216 or 218. The laser beam being tested is essentially turned on for the entire scan. As the laser beam sweeps across the sensing area 208, the sensor arrays 214 detect the position of the laser beam. The output of each of the fifteen sensor arrays 214 is converted to a digital signal by the analog to digital conversion circuitry 226 and the digitized sensor array information is communicated to the computer 206 for processing.

The software executed by the computer 206 processes cell intensity information read from the corresponding fifteen sensor arrays 214 to determine the location of the center of the laser beam for each corresponding sensor array 214. The measurements determined by the computer 206 are then optionally formatted, scaled or otherwise manipulated, and are then recorded in the memory device 24 of the optical scanner 10 under test. For example, the data in Table 3A for each color scan plane may be stored relative to its corresponding local beam origin. Since the measurements recorded from the sensing area 208 are recorded relative the test fixture origin 230 to which the optical scanner origin 132 is mapped, an appropriate coordinate transformation is performed. For example, to convert the X-axis (scan direction) measurements for the first test point $P_0$ to the corresponding local beam origin for each of the black, yellow, cyan and magenta scan planes respectively:

$$X_{0(Stored)} = X_{0(Measured)} - Xb + Xs;$$

$$X_{0(Stored)} = X_{0(Measured)} - Xy + Xs;$$

$$X_{0(Stored)} = X_{0(Measured)} + Xc - Xs;$$

$$X_{0(Stored)} = X_{0(Measured)} + Xm - Xs;$$

Also, to convert the Y-axis (process direction measurements) for the first test point $P_0$ for each of the black, yellow, cyan and magenta scan planes respectively:

$$Y_{0(Stored)} = Y_{(Measured)} - Yb + Ys$$

$$Y_{0(Stored)} = Y_{(Measured)} - Yy + Ys;$$

$$Y_{0(Stored)} = Y_{(Measured)} - Yc + Ys;$$

$$Y_{0(Stored)} = Y_{(Measured)} - Ym + Ys;$$

It is noted that the center of a laser beam may not strike exactly along a center of a cell in any given sensor array 214. Moreover, more than one cell will likely detect laser power in a given sensor array 214. Accordingly, depending upon the desired level of precision required, the laser beam intensity information read from each cell of a given sensor array 214 may be processed such as by averaging, weighting, taking the max or by implementing other statistical functions.

For example, a center of gravity weighting may be implemented for each sensor array 214 by locating the cell in the corresponding sensor array 214 that recorded the peak laser beam intensity value and summing that located cell, a weighted value derived from one or more cells to either side of the located maximum value. The sum of the peak value and weighted adjacent values is averaged to derive the process direction (Y-axis) value for that sensor array. Then, knowing the scan direction position of the first and last cell in that sensor array (or at least two cell locations), the scan direction (X-axis) measurement may be computed, such as by using standard geometry. Other correlation functions such as sliding window averaging, may alternatively be implemented. Notably, using the above technique, the corresponding position measurements may comprise floating point values.

To derive the angle measurements for each corresponding sensor array 214, the detection of the start of scan signal from the SOS/EOS sensor is arbitrarily assigned a measurement of 0 degrees. The angle for each sensor array 214 is then found by moving or "walking" a small pulse of light energy from the corresponding laser beam being tested which is delayed by various known amounts of time. Conceptually, a select laser is instructed to write a single Pel of information at a known Pel location. The system knows the time between when the start of scan signal is received and when the Pel of information is written. If the Pel does not hit any of the associated sensor arrays 214, then the test system moves on to the next Pel location, thus walking across the scan line writing one Pel at a time until all of the sensor arrays 214 are located. By knowing the time from receiving the start of scan signal until the sensor array is located, the angle is computed based upon the known rotational velocity of the polygonal mirror 36.

Instead of walking one Pel at a time, a binary search or other types of processing may be performed to determine the angle of each corresponding sensor array for a given laser beam under test. For example, in one laser beam sweep, a plurality of adjacent Pels may be written. If no sensor arrays 214 were detected, the next plurality of adjacent Pels may be written. This process continues until a corresponding one or more of the associated sensor arrays 214 detect laser beam energy. Once a strike on a sensor array is detected, the plurality of previously written Pel locations is cut in half, and the process is repeated. For example, if Pels 0–999 were written and no laser energy was detected on any of the sensor arrays, the corresponding laser beam would next write Pels 1000–1999 and so on. Assume that one sensor array was detected in the range of Pels from 1000–1999, the next laser beam sweep will write Pels 1000–1499. If no strike on the sensor array is detected, the laser beam sweep will write to Pels 1500–1999. This process continues by halving the plurality of written Pels where the sensor array was detected, until a specific Pel location is determined. Once the Pel location is identified for a given sensor array, the corresponding angle can be computed as noted above. It is noted that some rounding may be required in ascertaining the Pel location of a given sensor array.

Before storing each of the determined angle measurements, an optional scaling may be applied. For example, a scanner angle may be measured to within several decimal places of accuracy. In order to avoid storing angles with their fractions, a scaling may optionally be provided to the measurement before being stored in memory. Each measured angle may be multiplied by an integer that is at least as large in magnitude as the number of decimals of precision of the angle measurement being scaled to convert that angle to an integer. For example, a hypothetical angle measurement of 5.612 degrees can be scaled by an integer greater than, or equal to 1000 (corresponding to three decimal places of precision). In one exemplary application, each angle measurement is scaled by multiplying it by 8192 before being written to the memory device 24.

The First And Last Writable Pels

A predetermined amount of time after detecting the corresponding start-of-scan signal 134, 136 for a given laser beam, i.e., when a detect-to-print time has expired, a detect-to-print signal is provided. The detect-to-print signal indicates that the laser beam has reached a position corresponding to the first edge of a print medium, which designates the first writable Pel location, Pel 0. Correspondingly, the last writable Pel location along a page is designated Pel m. If the detect-to-print time is not modified by registration data, the location of Pel 0 may be determined by the nominal detect to print time. To simulate this in the first test fixture 200, a sensor 232, 234 is provided in each bank 216, 218 to identify the location of Pel 0. Similarly, a sensor 236, 238 may be provided in each bank 216, 218 to simulate the last writable Pel Pel m. For example, with reference to bank 216, the Pel 0 sensor 232 is positioned where the first edge of a page would be detected and the Pel m sensor is positioned where the second edge of the page would be detected if the optical scanner 10 were installed in an actual electrophotographic device 27, instead of the first test fixture 200. As an alternative to providing a separate sensor for Pel 0, one of the fifteen sensor arrays in each bank 216, 218 could be designated Pel 0. Correspondingly, one of the fifteen sensor arrays in each bank 216, 218 could be designated Pel m.

If one of the sensor arrays 214 is positioned at Pel 0, then the angle measurement ($A_{ndp}$) is simply the angle measurement of that sensor array. If none of the sensor arrays 214 are positioned at location Pel 0, then the angle measurement ($A_{ndp}$) for each laser beam can be found using interpolation, extrapolation, or other curve fitting techniques. For example, assume that sensor 232 designating Pel 0 lies somewhere between $P_0$ and $P_1$. The scan direction (X-axis) position of Pel 0 can be precisely measured. The scan direction (X-axis) and angle measurements corresponding to test points $P_0$ and $P_1$ have already been determined as set out above. Accordingly, angle versus scan direction position can be plotted, and the angle of Pel 0 can be determined.

For example, using linear interpolation:

Pel 0 Angle(nominal)=(Pel 0 X position−lower bound X position)/(upper bound X position−lower bound X position)*(upper bound Angle−lower bound Angle)+lower bound Angle The computed value for Pel $0_{(nominal)}$, may then be optionally scaled or otherwise processed, and stored as the corresponding angle measurement ($A_{ndp}$). The above analysis applies equally to finding the angle of Pel m from the corresponding Pel m sensor 236, 238.

As noted above, the optical scanner 10 has two detect points (the first and second SOS pickoff mirrors 44, 46 and first and second EOS pickoff mirrors 48, 50) corresponding to a given beam path. The controller 228 in the interface 204 enables the determination of the degrees of facet rotation between the two corresponding detect points by measuring the time between the start of scan signal and the end of scan signal. Since the system knows the rotational velocity of the polygonal mirror, the software on the computer 206 can calculate the number of degrees between the start and end of scan, which is written to the memory device 26 on the optical scanner 10. For example, knowing the angle associated with the Pel 0 sensor 232, 234 and the corresponding Pel m sensor 236, 238, the angle therebetween is also known. Thus, given a known rotational velocity of the rotating polygonal mirror 36, the SOS/EOS timing can be computed.

Laser Power Management

Figure 4:
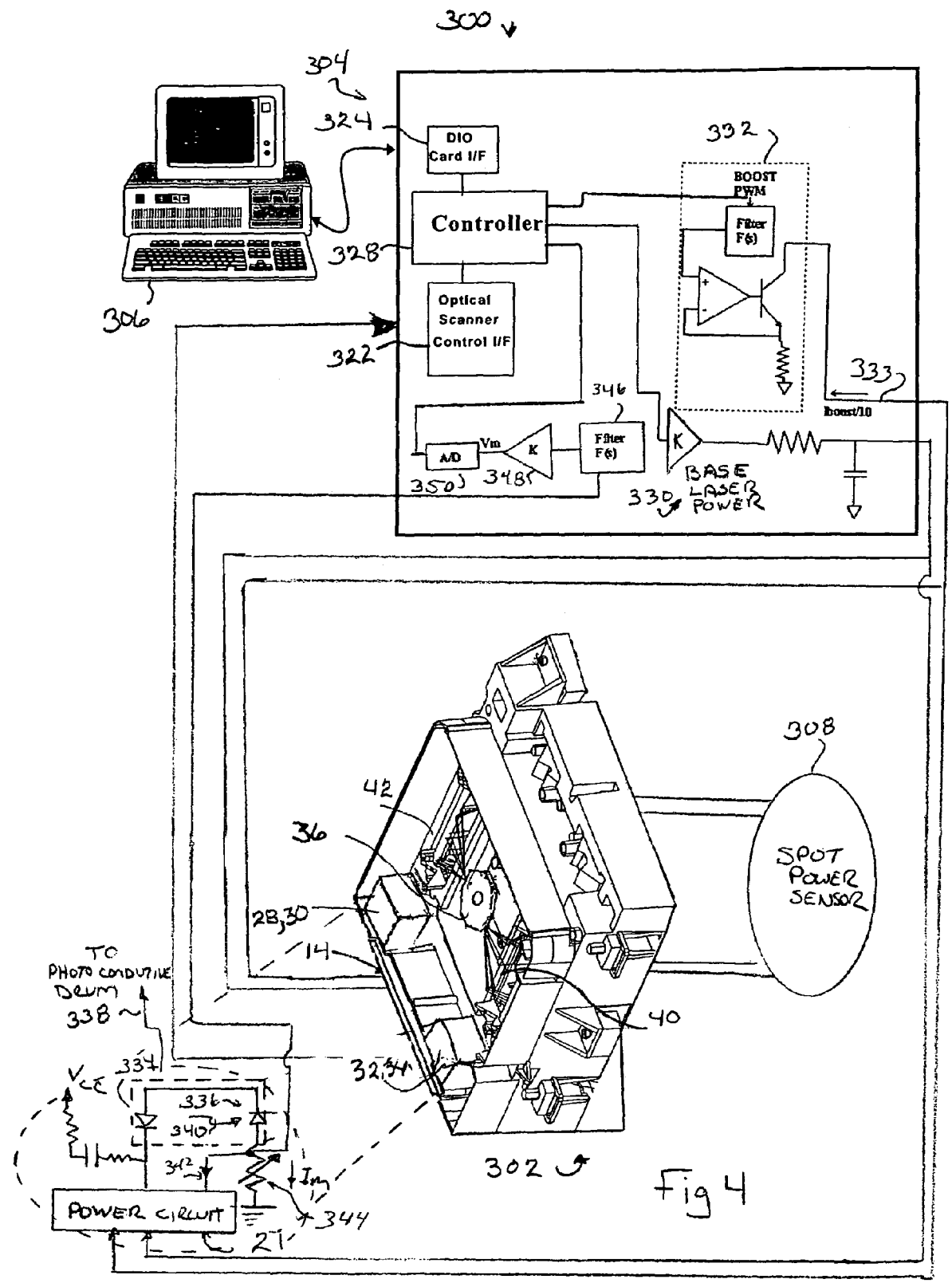
FIG. 4 is a schematic representation of a second test fixture for deriving characterizing data that is stored on a memory device of the optical scanner shown in FIG. 1.

In addition to storing information that characterizes laser beam scan paths, the memory device 24 can be used to store information that characterizes laser beam power characteristics for each laser in the optical scanner 10. Referring to FIG. 4, the optical scanner 10 is placed into a second test fixture 300 that includes a mounting device 302 for supporting the optical scanner 10 under test, an interface 304, a computer 306 and at least one spot power sensor 308. In a manner analogous to that described above with reference to FIG. 3, the interface comprises an optical scanner interface 322 for communication with an optical scanner under test, a host computer interface 324 for communication with the computer 306, and a controller 328. The controller 328 is operatively configured to control functions of the optical scanner under test to derive parameters related to laser beam power.

As noted above, in an electrophotographic device 27, such as a printer, a photosensitive drum is exposed to laser light by a corresponding one of the laser beams in the optical scanner 10 prior to the application of toner to the drum surface. The amount of toner applied to the drum is highly sensitive to the amount of optical energy applied to the drum by the corresponding laser beam, thus making the overall print quality of the electrophotographic device 27 sensitive to the optical output of the corresponding laser in the optical scanner 10. However, the relationship between laser power and laser current varies from device to device making it difficult if not impossible to generalize a determined amount of spot power output generated by a given laser based solely on the current used to drive the laser.

Spot Power Calibration

One approach to accommodate for differing laser characteristics is to calibrate the current of each laser to achieve a desired spot power output and store the appropriate calibration information on the memory device 24 of the optical scanner 10. A laser power signal 330, such as from a pulse width modulated (PWM) source, is provided for each laser beam in the optical scanner 10. The laser power signal is intended to simulate the laser power signal provided by an actual electrophotographic device 27 and is thus controlled to be within a range of laser power signals in typical electrophotographic device 27s. The laser power signal 330 is schematically illustrated as being generated by the interface 304, but may alternatively come from other sources so long as the laser power signal is controllable. Also, a unique laser power signal 330 need not be provided for each laser if simultaneous testing is not desired.

The laser power signal 330 comprises two currents. A first current provides a constant bias that alone is generally not enough to allow the corresponding laser to emit laser light. That is, the bias current is sufficient to operate the corresponding laser in a spontaneous emissions mode of operation. To drive the corresponding laser to emit laser light, a second current is provided to the laser power signal 330 when the laser is to be turned on. The second current should be sufficient to transition the corresponding laser from the spontaneous emissions mode to a laser emissions mode where it can emit laser light as described in detail below. An additional current boost control 332 may also be provided for performing calibration procedures, such as for SOS/EOS detection, as is also discussed below.

In one illustrative embodiment of the present invention, each laser 28, 30, 32 and 34 comprises a laser diode 334, a photodetector (also referred to herein as a photodiode) 336, e.g., a positive-intrinsic-negative (PIN) diode and corresponding power management circuitry 21. An exemplary laser diode 334, photo diode 336 and power management circuitry 21 are schematically shown in an exploded view for purposes of clarity. In practice, the combination laser diode and photodiode 334, 336 define the lasers 28, 30, 32 and 34.

The inclusion of the photodiode 336 or like device allows the optical energy of the laser 334 to be monitored and controlled. When the laser power signal 330 is applied to a corresponding one of the lasers and sufficient current flows causing that laser to emit light, two laser beams are generated by the laser. A first beam 338 provides the laser output that is directed to the post scan optics and the corresponding photoconductive surface 33 (not shown in FIG. 4). A second beam 340 strikes the photodiode 336. The amount of current that flows in the photodiode 336 is linear with laser light and may thus be used to characterize the output power of the laser beam 338.

The output of the photodiode 336 of each laser is converted into a control signal 342 that is passed to its corresponding power management circuitry 21 to adjust the power output of the power management circuitry 21. For example, the photodiode current $I_m$ shown in FIG. 4 can be converted to a voltage, such as by a potentiometer 344, designated herein as $R_{ADJ}$ so that the control signal 342 is based upon voltage across the potentiometer 344.

To perform the spot power calibration, the computer 306 instructs the interface 304 to cause the optical scanner under test to turn on a laser beam and keep the laser beam on during the test. The interface 304 may optionally wait several scans until the optical scanner warms up to allow the laser power to reach steady state unaffected by rise and fall times of the laser power for the laser. The laser power signal 330 is set to a predetermined current level, denoted herein as $Lpow_0$, and the spot power of the emitted laser beam is measured by the spot power sensor 308. The measured spot power is compared to a predetermined, target spot power, denoted herein as $SP_0$. Either by manual means such as adjustment of the potentiometer 344 or automatic means, the control signal 342 is adjusted until the spot power measured by the spot power sensor 308 approximates the target spot power $SP_0$. After each adjustment, the spot power sensor 308 may be rechecked and the process continues until the spot power measured by the spot power sensor 308 approximates the target spot power $SP_0$.

Once the spot power measured by the spot power sensor 308 is suitably calibrated to the target spot power $SP_0$, the value of the control signal 342 may be determined. For example, the voltage across the potentiometer 344 can be coupled to the interface 304. The interface 304 first optionally processes the voltage measurement, such as by applying a filter 346, and/or an optional gain adjustment 348. An analog to digital converter 350 is then used to convert the analog voltage to a digital format. The digitized voltage measurement, designated $Vm_0$ representing the (optionally filtered and scaled) voltage across the potentiometer 334, can then optionally be communicated to, and further processed by the computer 306.

Once the spot power has been calibrated, data corresponding to the calibration may be stored on the memory device 24 of the optical scanner 10, such as by the interface 304 writing to the memory device 24 of the optical scanner under test. For example, as shown in Table 3B, three variables are stored in the memory device 24 for each laser corresponding to spot power including Ems reading, spot power adjust, and PWM@Power Adj. variables.

TABLE 3B

Manufacturing

| Name | Units | Size (Bytes) | Description |
| --- | --- | --- | --- |
| Black Ems Reading | millivolts | 2 | EMS Reading at Power Adjust Station |
| Black Spot Power Adj. | uWatts | 2 | Spot Power Setting |
| Black PWM @ Pwr Adj. | % | 1 | Per Cent PWM value at Power Adjust |
| Magenta Ems Reading | millivolts | 2 | EMS Reading at Power Adjust Station |
| Magenta Spot Power Adj. | uWatts | 2 | Spot Power Setting |
| Magenta PWM @ Pwr Adj. | % | 1 | Per Cent PWM value at Power Adjust |
| Cyan Ems Reading | millivolts | 2 | EMS Reading at Power Adjust Station |
| Cyan Spot Power Adj. | uWatts | 2 | Spot Power Setting |
| Cyan PWM @ Power Adj. | % | 1 | Per Cent PWM value at Power Adjust |
| Yellow Ems Reading | millivolts | 2 | EMS Reading at Power Adjust Station |
| Yellow Spot Power Adj. | uWatts | 2 | Spot Power Setting |
| Yellow PWM @ Pwr Adj. | % | 1 | Per Cent PWM value at Power Adjust |
| Black Laser Turn On | ma | 2 | Laser Turn On for Laser (ma) |
| Black Differential Eff. | uWatts/V | 2 | Change in printhead spot power per volt of boost |
| Magenta Laser Turn On | ma | 2 | Laser Turn On for Laser (ma) |
| Magenta Differential Eff. | uWatts/V | 2 | Change in printhead spot power per volt of boost |
| Cyan Laser Turn On | ma | 2 | Laser Turn On for Cyan Laser (ma) |
| Cyan Differential Eff. | uWatts/V | 2 | Change in printhead spot power per volt of boost |
| Yellow Laser Turn On | ma | 2 | Laser Turn On for Laser (ma) |
| Yellow Differential Eff. | uWatts/V | 2 | Change in printhead spot power per volt of boost |
| Black SOS Detect Power | uWatts | | 10X SOS Detect Power |
| Black EOS Detect Power | uWatts | | 10X EOS Detect Power |
| Magenta SOS Detect Power | uWatts | | 10X SOS Detect Power |
| Magenta EOS Detect Power | uWatts | | 10X EOS Detect Power |
| Cyan SOS Detect Power | uWatts | | 10X SOS Detect Power |
| Cyan EOS Detect Power | uWatts | | 10X EOS Detect Power |
| Yellow SOS Detect Power | uWatts | | 10X SOS Detect Power |
| Yellow EOS Detect Power | uWatts | | 10X EOS Detect Power |

The Ems reading corresponds to the (optionally scaled and filtered) digital approximation of the voltage across the potentiometer 344 when the power management circuitry 21 is suitably calibrated to the target spot power $SP_0$. The spot power adjust corresponds to the target spot power $SP_0$. Correspondingly, the PWM@Power Adj. variable corresponds to $Lpow_0$, i.e., the predetermined current level of the laser power signal 330 used to set the spot power output of the corresponding laser beam. For convenience, the current $Lpow_0$ may be stored as a duty cycle, i.e., a percent pulse width modulated value. The above test for spot power is performed for each of the lasers, either simultaneously or individually, in the optical scanner 10 with the results being stored on the memory device 24 of the optical scanner 10.

It should also be noted that an EMS constant, designated Kems may also be determined and/or stored on the memory device 24. The EMS constant is determined by taking the ratio of $Vm_0$, i.e., the measurement corresponding to the voltage across the potentiometer 344, to $Sp_0$, i.e., the target spot power. The Kems constant takes advantage of the observation that the current output by the photodiode 336 varies linearly with spot power. The constant Kems further conveniently characterizes the DC gain of the filter and amplifier used to measure the voltage across the power adjustment potentiometer 344.

Laser Turn on

The computer 306 instructs the optical scanner 10 via the interface 304 to begin to increase a boost signal 333 from a value where a corresponding one of the lasers does not emit laser light, e.g., starting generally near the steady state bias current, to determine how much current is required to transition the laser beam from the spontaneous emissions mode of operation to an operational current where the corresponding laser is emitting laser light. The boost signal 333 is derived from a PWM boost control 332. The computer 306 instructs the PWM boost control 332 via the interface 304 to begin increasing the boost signal 333 until laser light is detected from the corresponding laser beam. Laser light may be detected by monitoring the spot power sensor 308 for the detection of laser light energy, or alternatively, the voltage across the potentiometer 344 may be monitored as noted above utilizing the analog to digital converter 350 and communicating the digitized voltage measurements to the computer 306.

Differential Efficiency

Figure 5:
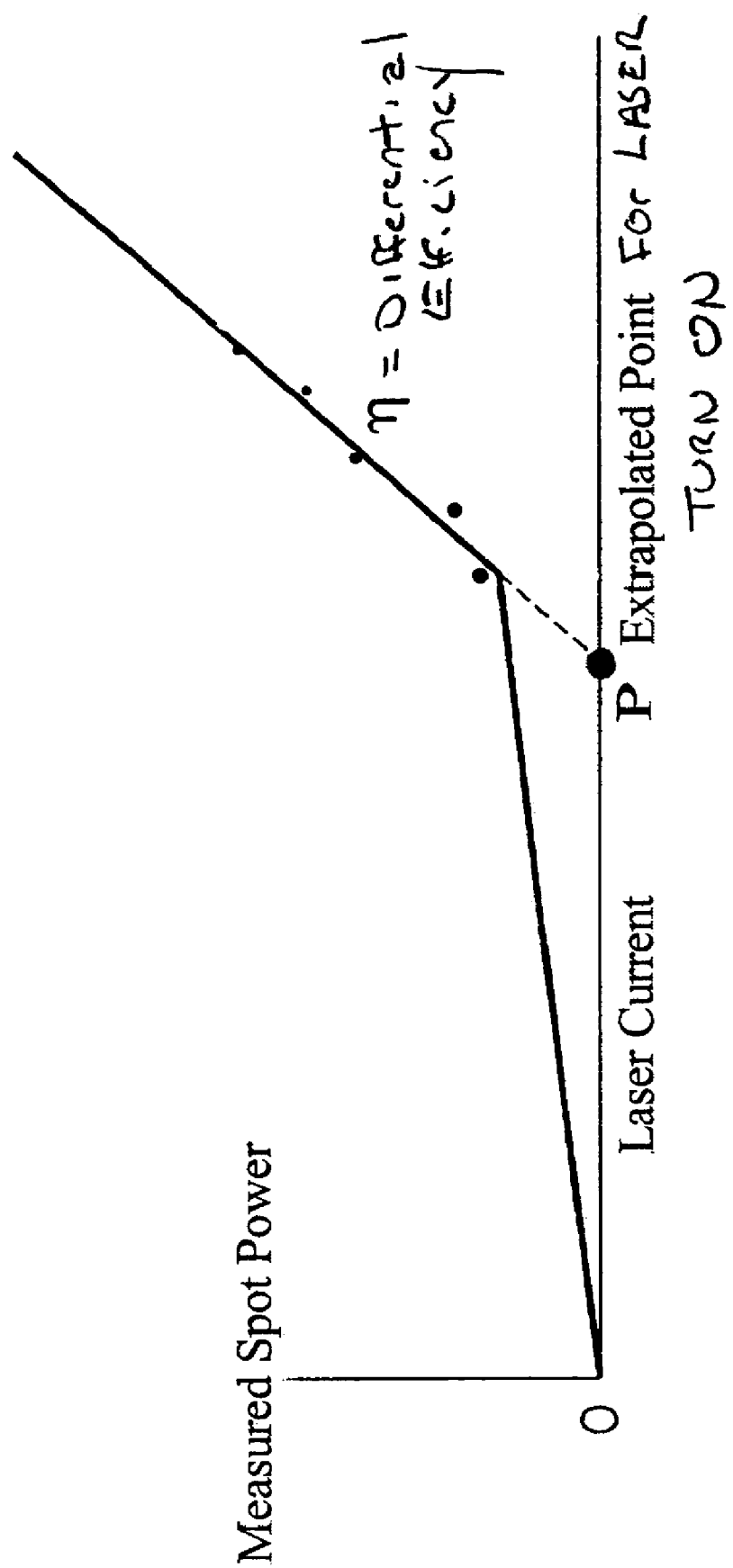
FIG. 5 is an exemplary graph of laser beam input current versus laser beam output power according to an embodiment of the present invention.

Once laser light is detected as noted above, the system may continue to increase the boost signal 333 and to sample the voltage across the potentiometer 344 and/or measure spot power via the spot power sensor 308 to collect several data points that relate spot power as a function of laser beam current. As noted above, the voltage across the potentiometer 344 provides a characterization of spot power generated by the corresponding boost signal 333. With several data points, the system can use any number of techniques, e.g., best fit regression, averaging, windowing, etc., to determine the laser efficiency as illustrated in FIG. 5. That is, the slope of the linear portion of the measured/computed spot power versus laser drive current line is designated the laser differential efficiency for that laser.

It shall be observed that the spot power can be measured from the spot power sensor 308 or computed from the voltage across the Radj potentiometer 344 based upon the computed constant Kems described above. That is, the computed spot power $Sp_{(current)}=V_{(measured)}/$Kems. Also, the current is known and is based upon the PWM duty cycle of the power signal 333.

For each laser, the corresponding determined laser beam turn on current and the differential efficiency are recorded in the memory device 24 on the optical scanner 10. The stored values may be converted, scaled, processed or otherwise manipulated by the computer 306 before being written to the memory device 24. For example, as shown in Table 3B, each differential efficiency determination is stored as a change in spot power per volt as detected across the potentiometer 344. Also, the laser beam turn on for each laser may comprise the detected current at which the laser turned on, or the laser turn on can be expressed in alternative manners. For example, the laser turn on for each laser may be computed based upon the corresponding differential efficiency by extrapolating the linear portion of the efficiency curve to a point which is at an intersection with an the X-axis, as represented in FIG. 5 by the designated point P.

SOS/EOS Detect

Also, the start-of-scan and end-of-scan detect power is recorded in the memory device 24 on the optical scanner under test. The start-of-scan and end-of-scan detect power may be determined from the optical requirements, e.g., sensitivity, of the sensors in the optical scanner 10. Note that in the embodiment illustrated with reference to FIG. 1, the cyan and magenta share a single SOS/EOS sensor. Similarly, the yellow and black share a single SOS/EOS sensor. Under such an arrangement, the computer can mirror the power values read for the beams that are not detected. That is, assume that the black beam is used to detect the SOS/EOS sensor. Then the black SOS/EOS detect power is written to the memory device 24 on the optical device 10 in the memory locations for both the black and yellow image planes.

Having described the invention in detail and by reference to preferred embodiments thereof, it will be apparent that modifications and variations are possible without departing from the scope of the invention defined in the appended claims.

What is claimed is:

1. An optical scanner for installation into an electrophotographic device comprising:
   a laser configured to emit a laser beam;
   laser optics arranged to sweep said laser beam along a non-ideal laser beam scan path; and
   scanner circuitry comprising:
   a first interface operatively configured to communicate with a controller in a corresponding electrophotographic device to which said optical scanner is installed; and
   a memory device having stored thereon, data that characterizes said laser beam scan path, wherein said data is communicated to said controller through said first interface after installation of said optical scanner in said corresponding electrophotographic device such that electronic compensation of said laser beam scan path is performed by said eletrophotographic device during imaging operations based upon said data.

2. The optical scanner according to claim 1, wherein said data that characterizes said laser beam scan path comprises laser beam position measurements taken at a plurality of test points, wherein process direction position errors of said laser beam scan pat may be electronically compensated by said controller.

3. The optical scanner according to claim 2, wherein a scan direction measurement and a process direction measurement are taken at each of said plurality of test points.

4. The optical scanner according to claim 3, wherein a corresponding laser beam velocity measurement is taken at each of said plurality of test points, wherein laser beam scan path velocity nonlinearity may be compensated for by said controller.

5. The optical scanner according to claim 4, wherein said laser optics comprises a rotating polygonal mirror and each of said laser beam velocity measurements comprises a measure of the angle of rotation of said rotating polygonal mirror.

6. The optical scanner according to claim 3, wherein said laser beam position measurements are stored on said memory device such that said scan direction measurements for each of said plurality of test points are encoded into a first vector and said process direction measurements for each of said plurality of test points are encoded into a second vector.

7. The optical scanner according to claim 2, wherein said laser beam position measurements comprise measurements taken of said laser beam prior to said optical scanner being installed into said electrophotographic device.

8. The optical scanner according to claim 2, wherein said plurality of laser beam position measurements comprise position measurements of a test laser beam that is not part of said optical scanner.

9. The optical scanner according to claim 1, wherein said optical scanner comprises a plurality of lasers, each laser associated with a corresponding color image plane, wherein a plurality of laser beam position measurements comprises a plurality of laser beam position measurements for each of said lasers.

10. The optical scanner according to claim 1, wherein said scanner circuitry comprises a second interface, said first and second interfaces configured such that said electrophotographic device communicates memory data with said memory device using said first interface and said electrophotographic device communicates image data to be printed to said laser using said second interface.

11. An optical scanner for installation into an electrophotographic device comprising:
  a laser configured to emit a laser beam;
  laser optics arranged to sweep said laser beam across an associated photoconductive surface of said electrophotographic device; and
  scanner circuitry comprising:
    a first interface operatively configured to communicate with a controller in a corresponding electrophotographic device to which said optical scanner is installed; and
    a memory device having a plurality of storage locations thereon, wherein after installation of said optical scanner in said corresponding electrophotographic device, said controller reads operational parameters from said memory device for performing electronic compensation of non-ideal laser beam characteristics, and said controller writes operational parameters related to the operation of said electrophotographic device to said memory device using said first interface.

12. The optical scanner according to claim 11, wherein said operational parameters comprise at least one of a measure of temperature within said electrophotographic device, an operational cycle count of a component within said electrophotographic device, and a power on time count of said electrophotographic device.

13. The optical scanner according to claim 11, wherein said operational parameters comprise registration information that is typically stored by a controller in said electrophotographic device, which is mirrored to said memory device.

14. An optical scanner for installation into an electrophotographic device comprising:
  a laser configured to emit a first laser beam and a second laser beam;
  laser optics arranged to sweep said first laser beam across an associated photoconductive surface of said electrophotographic device;
  a photodetector configured to measure the intensity of said second laser beam; and
  scanner circuitry comprising:
    a first interface operatively configured to communicate with a controller in a corresponding electrophotographic device to which said optical scanner is installed; and
    a memory device having stored thereon, first data that characterizes laser beam power parameters based upon measurements taken by said photodetector before said optical scanner is installed in said corresponding electrophotographic device, wherein said first data is communicated to said electrophotographic device through said first interface and said electrophotographic device performs electronic compensation based upon said first data after said optical scanner is installed in said corresponding electrophotographic device.

15. The optical scanner according to claim 14, wherein said laser beam power parameters comprise a measure of laser differential efficiency.

16. The optical scanner according to claim 14, wherein said laser beam power parameters comprise a measure of laser beam turn on current required for said laser to conduct laser energy.

17. The optical scanner according to claim 14, wherein said laser beam power parameters comprise a measure of current supplied to said laser to achieve a predetermined level of spot power from said laser beam.

18. The optical scanner according to claim 14, wherein said laser beam power parameters comprise a constant that corresponds to a given change in input current to said laser to a change in spot power.

19. An optical scanner for installation into an electrophotographic device comprising:
  a laser configured to emit a laser beam;
  laser optics arranged to direct said laser beam towards an associated imaging medium of said electrophotographic device; and
  scanner circuitry comprising:
    a first interface operatively configured to communicate with a controller in a corresponding electrophotographic device to which said optical scanner is installed; and
    a memory device having:
      a plurality of addressable storage locations partitioned into identification, history, and manufacturing sections wherein:
        said identification section comprises data stored therein that uniquely identifies said optical scanner;
        said history section comprises storage locations that can be written to and read by said electrophotographic device to store data related to operating parameters of said electrophotographic device; and said manufacturing section comprises data recorded in said memory device during manufacturing that characterizes said optical scanner such that after said optical scanner is installed in said corresponding electrophotographic device, said electrophotographic device implements adjustments to compensate for laser beam scan path characteristics unique to said optical scanner.

* * * * *